United States Patent
Shukla et al.

(10) Patent No.: US 11,494,639 B2
(45) Date of Patent: Nov. 8, 2022

(54) BAYESIAN-OPTIMIZATION-BASED QUERY-EFFICIENT BLACK-BOX ADVERSARIAL ATTACKS

(71) Applicant: Robert Bosch GmbH, Stuttgart (DE)

(72) Inventors: Satya Narayan Shukla, Amherst, MA (US); Anit Kumar Sahu, Pittsburgh, PA (US); Devin Willmott, Pittsburgh, PA (US); Jeremy Zieg Kolter, Pittsburgh, PA (US)

(73) Assignee: Robert Bosch GmbH, Stuttgart (DE)

( * ) Notice: Subject to any disclaimer, the term of this patent is extended or adjusted under 35 U.S.C. 154(b) by 635 days.

(21) Appl. No.: 16/580,587

(22) Filed: Sep. 24, 2019

(65) Prior Publication Data

US 2021/0089879 A1 Mar. 25, 2021

(51) Int. Cl.
*G06N 3/08* (2006.01)
*G06N 20/00* (2019.01)
*G06T 3/40* (2006.01)
*G06F 17/18* (2006.01)
(Continued)

(52) U.S. Cl.
CPC .............. *G06N 3/08* (2013.01); *G06F 17/18* (2013.01); *G06K 9/6256* (2013.01); *G06K 9/6268* (2013.01); *G06K 9/6278* (2013.01); *G06N 20/00* (2019.01); *G06T 3/40* (2013.01); *G06V 10/82* (2022.01)

(58) Field of Classification Search
CPC .......... G06N 3/08; G06N 20/00; G06V 10/82; G06F 17/18; G06K 9/6268; G06K 9/6278; G06T 3/40
See application file for complete search history.

(56) References Cited

U.S. PATENT DOCUMENTS

| 2019/0050727 A1* | 2/2019 | Anderson | G06N 3/08 |
| 2020/0082097 A1* | 3/2020 | Poliakov | G06K 9/6267 |
| 2020/0250304 A1* | 8/2020 | Kruus | G06N 3/088 |

(Continued)

OTHER PUBLICATIONS

Shukla, Satya Narayan, et al. "Black-box adversarial attacks with bayesian optimization." arXiv preprint arXiv: 1909.13857 (2019). (Year: 2019).*

(Continued)

*Primary Examiner* — Fayyaz Alam
(74) *Attorney, Agent, or Firm* — Brooks Kushman P.C.

(57) ABSTRACT

Performing an adversarial attack on a neural network classifier is described. A dataset of input-output pairs is constructed, each input element of the input-output pairs randomly chosen from a search space, each output element of the input-output pairs indicating a prediction output of the neural network classifier for the corresponding input element. A Gaussian process is utilized on the dataset of input-output pairs to optimize an acquisition function to find a best perturbation input element from the dataset. The best perturbation input element is upsampled to generate an upsampled best input element. The upsampled best input element is added to an original input to generate a candidate input. The neural network classifier is queried to determine a classifier prediction for the candidate input. A score for the classifier prediction is computed. The candidate input is accepted as a successful adversarial attack responsive to the classifier prediction being incorrect.

21 Claims, 2 Drawing Sheets

(51) Int. Cl.
    *G06K 9/62*         (2022.01)
    *G06V 10/82*     (2022.01)

(56) References Cited

U.S. PATENT DOCUMENTS

2021/0089866 A1*   3/2021   Kolter ................. G06N 3/0454
2022/0180447 A1*   6/2022   Kearney ................. G06N 3/08

OTHER PUBLICATIONS

Liao, Fangzhou, et al. "Defense against adversarial attacks using high-level representation guided denoiser." Proceedings of the IEEE conference on computer vision and pattern recognition. 2018. (Year: 2018).*

Hendrycks, Dan, and Thomas Dietterich. "Benchmarking neural network robustness to common corruptions and perturbations." arXiv preprint arXiv: 1903.12261 (2019). (Year: 2019).*

Ilyas et al., Black-box Adversarial Attacks with Limited Queries and Information, 35th International Conference on Machine Learning, Stockholm, Sweden, Jul. 2018.

Ilyas et al., Prior Convictions: Black-Box Adversarial Attacks With Bandits and Priors, 7th International Conference on Learning Representations, New Orleans, LA, May 2019.

Moon et al., Parsimonious Black-Box Adversarial Attacks via Efficient Combinatorial Optimization, 36th International Conference on Machine Learning, Long Beach, CA, Jun. 2019.

* cited by examiner

BAYESIAN-OPTIMIZATION-BASED QUERY-EFFICIENT BLACK-BOX ADVERSARIAL ATTACKS

TECHNICAL FIELD

The present disclosure relates to performing an adversarial attack on a neural network classifier, and, more specifically, to Bayesian-optimization-based query-efficient black-box adversarial attacks.

BACKGROUND

Black box adversarial attacks are an active area of research. The following three references each describe approaches to crafting black box adversarial examples. An approach using natural evolution strategies is found in Ilyas, A., Engstrom, L., Athalye, A., & Lin, J. (2018, July). Black-box Adversarial Attacks with Limited Queries and Information, published in *International Conference on Machine Learning*. arXiv:1804.08598. This reference defines three realistic threat models that more accurately characterize many real-world classifiers: the query-limited setting, the partial information setting, and the label-only setting. The reference develops new attacks that fool classifiers under these more restrictive threat models, where previous methods would be impractical or ineffective. The reference demonstrates that our methods are effective against an ImageNet classifier under our proposed threat models. The reference also demonstrates a targeted black-box attack against a commercial classifier, overcoming the challenges of limited query access, partial information, and other practical issues to break the Google Cloud Vision API.

An approach that estimates the gradient with gradient priors, and then performs gradient descent, is found in Ilyas, A., Engstrom, L., & Madry, A. (2018). Prior convictions: Black-box adversarial attacks with bandits and priors. arXiv preprint arXiv:1807.07978. This reference studies the problem of generating adversarial examples in a black-box setting in which only loss-oracle access to a model is available. The reference introduces a framework that conceptually unifies much of the existing work on black-box attacks, and demonstrates that the current state-of-the-art methods are optimal in a natural sense. Despite this optimality, the reference shows how to improve black-box attacks by bringing a new element into the problem: gradient priors. The reference gives a bandit optimization-based algorithm that allows to seamlessly integrate any such priors, and explicitly identifies and incorporates two examples.

An approach that uses submodular optimization may be found in Moon, S., An, G., & Song, H. O. (2019). Parsimonious Black-Box Adversarial Attacks via Efficient Combinatorial Optimization. arXiv preprint arXiv:1905.06635. The reference proposes an efficient discrete surrogate to the optimization problem which does not require estimating the gradient and consequently becomes free of the first order update hyperparameters to tune. The experiments on Cifar-10 and ImageNet show the black-box attack performance with significant reduction in the required queries compared to a number of recently proposed methods.

SUMMARY

In one or more illustrative examples, a method for performing an adversarial attack on a neural network classifier, includes constructing a dataset of input-output pairs, each input element of the input-output pairs randomly chosen from a search space, each output element of the input-output pairs indicating a prediction output of the neural network classifier for the corresponding input element; utilizing a Gaussian process on the dataset of input-output pairs to optimize an acquisition function to find a best perturbation input element from the dataset; upsampling the best perturbation input element to generate an upsampled best input element; adding the upsampled best input element to an original input to generate a candidate input; querying the neural network classifier to determine a classifier prediction for the candidate input; computing a score for the classifier prediction; and accepting the candidate input as a successful adversarial attack responsive to the classifier prediction being incorrect.

The method may further include rejecting the candidate input responsive to the classifier prediction being correct. The method may further include, responsive to rejecting the candidate input, adding the candidate input and classifier output to the dataset and continuing to iterate through the dataset to generate candidate inputs until a predefined number of queries of the dataset have elapsed.

In the method, the neural network classifier may be an image classifier, the original input may be an image input, the perturbation may be an image perturbation, and the candidate input may be a pixelwise sum of the image input and the image perturbation, wherein each pixel of the image perturbation is smaller than a predefined size.

In the method, the perturbation input element may be of a smaller dimension than the original image. In the method, the predefined size of the image perturbation may be no larger than a particular value in either an $L_2$ norm or an $L_\infty$ norm.

In the method, the neural network classifier may be an audio classifier, the original input may be an audio input, the perturbation may be an audio perturbation, the candidate input may be a sum of the audio input and the audio perturbation, and the norm for the classifier may measure human auditory perception.

In the method, the upsampling may be performed using nearest-neighbor upsampling. In the method, the classifier may output predictions for each of a plurality of possible class labels for the input to the classifier. Or, the classifier may output only the most likely predicted class of the plurality of possible class labels for the input to the classifier.

In one or more illustrative examples, a computational system for performing an adversarial attack on a neural network classifier, includes a memory storing instructions of Bayesian optimization and dimensionality reduction algorithms of a software program; and a processor programmed to execute the instructions to perform operations including to construct a dataset of input-output pairs, each input element of the input-output pairs randomly chosen from a search space, each output element of the input-output pairs indicating a prediction output of the neural network classifier for the corresponding input element; utilize a Gaussian process on the dataset of input-output pairs to optimize an acquisition function to find a best perturbation input element from the dataset; upsample the best perturbation input element to generate an upsampled best input element; add the upsampled best input element to an original input to generate a candidate input; query the neural network classifier to determine a classifier prediction for the candidate input; compute a score for the classifier prediction; responsive to the classifier prediction being incorrect, accept the candidate input as a successful adversarial attack; and responsive to the classifier prediction being correct, rejecting the candidate input, add the candidate input and classifier output to the dataset; and continue to iterate through the dataset to generate candidate inputs until a predefined number of queries of the dataset have elapsed.

In the system, the neural network classifier may be an image classifier, the original input may be an image input, the perturbation may be an image perturbation, and the candidate input may be a pixelwise sum of the image input and the image perturbation, wherein each pixel of the image perturbation may be smaller than a predefined size In the system, the perturbation input element may be of a smaller dimension than the original image. In the system, the predefined size of the image perturbation may be no larger than a particular value in either an $L_2$ norm or an $L_\infty$ norm.

In the system, the neural network classifier may be an audio classifier, the original input may be an audio input, the perturbation may be an audio perturbation, the candidate input may be a sum of the audio input and the audio perturbation, and the norm for the classifier may measure human auditory perception.

In the system, the upsampling may be performed using nearest-neighbor upsampling. In the system, the classifier may output predictions for each of a plurality of possible class labels for the input to the classifier. Or, the classifier may output only the most likely predicted class of the plurality of possible class labels for the input to the classifier.

In one or more illustrative examples, a non-transitory computer-readable medium includes instructions for performing an adversarial attack on a neural network classifier that, when executed by a processor, cause the processor to construct a dataset of input-output pairs, each input element of the input-output pairs randomly chosen from a search space, each output element of the input-output pairs indicating a prediction output of the neural network classifier for the corresponding input element; utilize a Gaussian process on the dataset of input-output pairs to optimize an acquisition function to find a best perturbation input element from the dataset; upsample the best perturbation input element to generate an upsampled best input element; add the upsampled best input element to an original input to generate a candidate input; query the neural network classifier to determine a classifier prediction for the candidate input; compute a score for the classifier prediction; responsive to the classifier prediction being incorrect, accept the candidate input as a successful adversarial attack; and responsive to the classifier prediction being correct, rejecting the candidate input, add the candidate input and classifier output to the dataset; and continue to iterate through the dataset to generate candidate inputs until a predefined number of queries of the dataset have elapsed.

For the medium, the neural network classifier may be an image classifier, the original input may be an image input, the perturbation may be an image perturbation, and the candidate input may be a pixelwise sum of the image input and the image perturbation, wherein each pixel of the image perturbation may be smaller than a predefined size.

For the medium, the neural network classifier may be an audio classifier, the original input may be an audio input, the perturbation may be an audio perturbation, the candidate input may be a sum of the audio input and the audio perturbation, and the norm for the classifier may measure human auditory perception.

DETAILED DESCRIPTION

Figure 1:
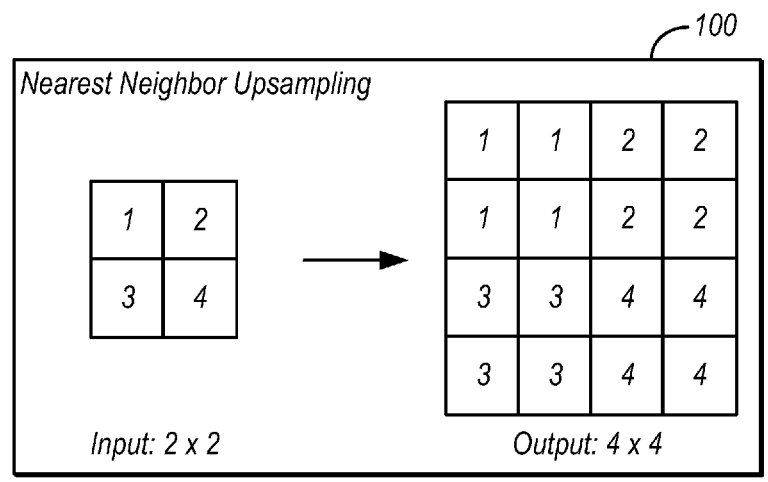
FIG. 1 is an example of nearest neighbor upsampling.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

This disclosure relates to a method for adversarially-attacking a deep neural network classifier. That is, the disclosure relates to a method that takes an existing image and finds a small perturbation to the image that is difficult or impossible for a human to detect (i.e., so the ground truth label stays the same), but that causes the neural network to misclassify the image. The notion of "small" is usually formalized by requiring that the size of the perturbation is no larger than a particular value E in some norm; $L_2$ norm and $L_\infty$ norm are common.

Adversarial attacks fall into one of two categories: white box attacks, where full knowledge by the adversary of the neural network architecture and parameters are assumed; and black box attacks, where access to such information is not available. This disclosure relates more specifically to the black box category, which is considered significantly more difficult.

In the black box attack setting, information about the model can be obtained only by querying, that is, by giving the model an input and obtaining its prediction, either as a single prediction over a class, or as a probability distribution over classes. As more information is gained about the model via querying, attack accuracy generally increases; however, in a real-world attack scenario, it is unrealistic to assume that a model may be queried as much as one would like. As such, during evaluation of black box attacks it is often assumed that there will be a maximum number of allowed queries per attack, called the query budget. The task is to maximize attack accuracy for a given query budget. It should be noted, however, that restricting to a given number of queries is a convention used in experiments to compare the success rate of attacks in a limited-query setting, but a fixed limit may not be strictly necessary in practice: one may stop after a certain number of queries, or (barring some outside restriction) one may be are free to keep querying as long as one chooses.

The method in this disclosure is designed to achieve much higher attack accuracy relative to methods mentioned above, particularly when the query budget is very small (under 1000, or even under 100). The disclosed approaches may accordingly be used to check for vulnerabilities for deployable deep learning models. As another application, the disclosed approaches may be used to generate data for adversarial training of deep neural networks to improve the robustness of the model. Thus, the computer system, computer-readable medium, and method aspects disclosed herein provide a non-abstract, technological improvement over known approaches for identifying model weaknesses as well as addressing those weaknesses.

To do so, two main techniques are used: Bayesian optimization and dimensionality reduction. Bayesian optimization is a gradient-free optimization method used in cases where the number of queries to the objective function are intended to be kept low. In Bayesian optimization, there is an objective function $f: \mathbb{R}^n \to \mathbb{R}$, and a desire to solve $$\operatorname*{argmin}_{x \in X} f(x).$$

This is done using a Gaussian process, which defines a probability distribution over functions from the search space X to $\mathbb{R}$, and an acquisition function A, which measures the potential benefit of adding an input-output pair (x, y) to the dataset.

Bayesian optimization begins with a dataset $D=\{(x_1, y_1), \ldots, (x_d, y_d)\}$ and a Gaussian process GP that takes D as a prior. Then, iteration is performed as follows:
For t=d+1, . . . :

1) $x_t \leftarrow \operatorname*{argmax}_{x \in X} A(GP, x)$ \\Find the maximizer $x_t$ of the acquisition function 2) $y_t \leftarrow f(x_t)$ \\Query $f$ at $x_t$ 3) $D \leftarrow D \cup (x_t, y_t)$ \\Add the input-output pair to the dataset 4) $x^* \leftarrow \operatorname*{argmin}_{x_i, 1 \leq i \leq t} y_i$ \\Choose current best minimizer $x^*$ 5) Update the Gaussian process GP with the new data point This process continues until the query budget of $f$ is reached, time runs out, or the function minimizer $x^*$ becomes adequate.

The speed and accuracy of Bayesian optimization is highly dependent on the dimension n of $f$; it is usually used when n is quite small, often less than 10. However, the dimensionality of inputs for even small neural networks often reach tens or hundreds of thousands. For Bayesian optimization to be useful, therefore, it is desirable to have a method of reducing the dimension of the inputs.

This dimension reduction may be performed by tiling the perturbation. For example, suppose a perturbation is attempted to be found of a 6×6 image. If each dimension is treated independently, this is a 36-dimensional optimization problem; however, if instead a 3×3 image is found (a 9-dimensional problem), nearest neighbor upsampling can be performed to produce a 6×6 perturbation. FIG. 1 illustrates an example 100 of nearest neighbor upsampling. Such an upsampling operation may be referred to as a function U.

Figure 2:
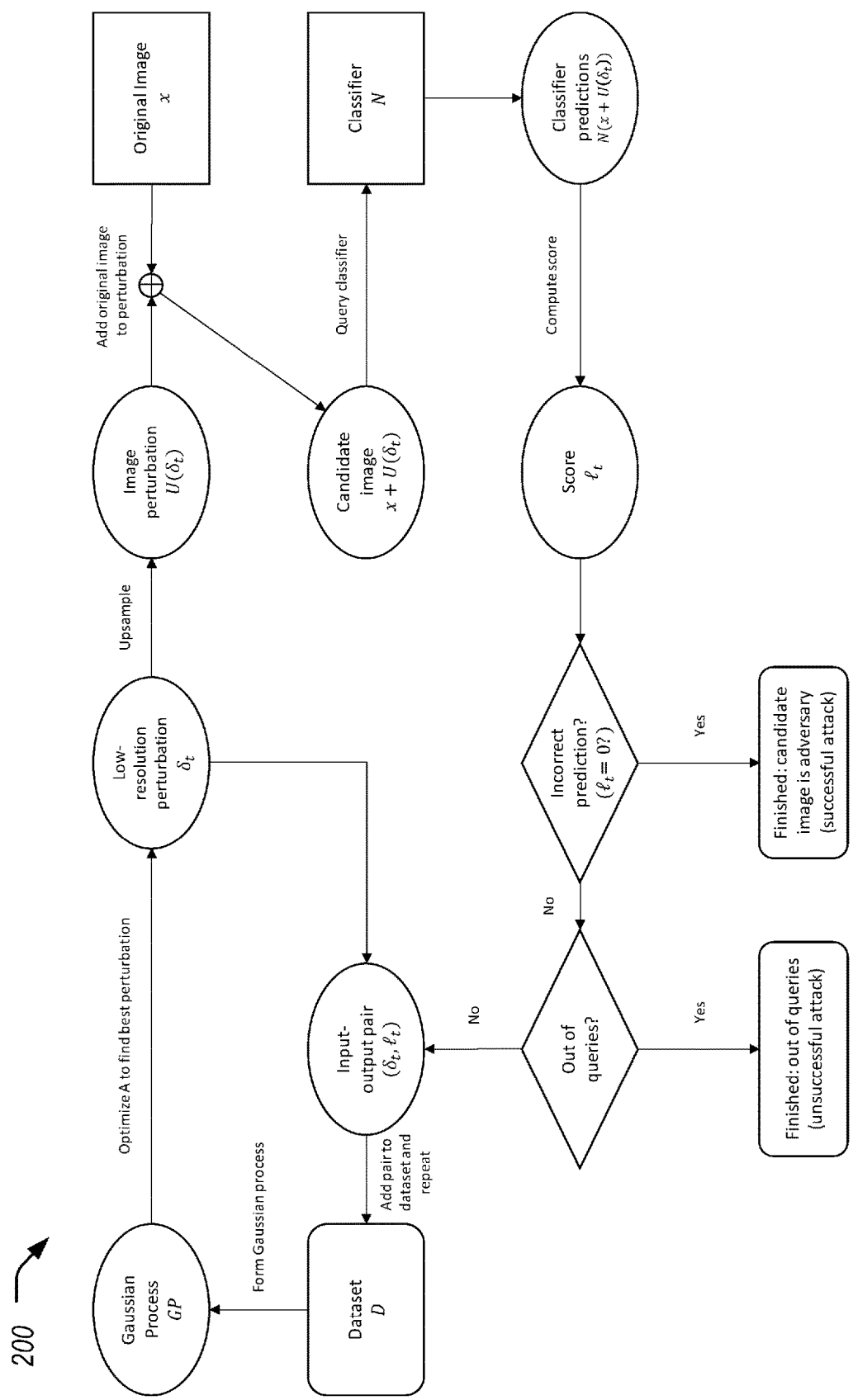
FIG. 2 is an example data flow diagram for performing Bayesian-optimization-based query-efficient black-box adversarial attacks.

FIG. 2 illustrates an example data flow diagram for performing Bayesian-optimization-based query-efficient black-box adversarial attacks. With reference to FIG. 2, suppose N is an image classifier for a K-class classification problem, and (x, y) is an image-label pair. Suppose an attack x is attempted. The output of the neural network, N(x), is a K-dimensional vector, and the predicted class is the index of the largest value of N(x), given by $$\operatorname*{argmax}_{k=1,\ldots,K} N(x)_k.$$

It can be assumed that x is classified correctly by N, that is, it is assumed that $$y = \operatorname*{argmax}_{k=1,\ldots,K} N(x)_k.$$

The objective is to find a perturbation that will cause N to misclassify x, with each pixel of the perturbation being smaller than $\epsilon$, and with a query budget of q. More specifically, it is desired to find a perturbation $\delta^*$ of a smaller image that will be upsampled and added to x to create a candidate image, where N will then misclassify the candidate image. Mathematically, this means the intent is to find a $\delta$ such that $|U(\delta^*)|_\infty \leq \epsilon$ and $$y \neq \operatorname*{argmax}_{k=1,\ldots,K} N(x + U(\delta^*))_k,$$

where U is an upsampling function (e.g., an example of which is shown above with respect to FIG. 1).

To do this, Bayesian optimization is performed, with search space $X=\{\delta: |\delta|_\infty \leq \epsilon\}$ and an objective function as follows:

$$f(\delta) = \max\left(N(x + U(\delta))_y - \left(\operatorname*{argmax}_{k \neq y} N(x + U(\delta))_k\right), 0\right).$$

For intuition behind why such a function is used, note that this is the difference between the value of the true label y and the highest other, or 0 if this value is negative. If $f(\delta)=0$ for some $\delta$, then $x+U(\delta)$ is a successful adversarial attack on N, since this can happen if and only if the output of the network $N(x+U(\delta))$ on the true class label y is smaller than some other element of the output.

To begin, a dataset $D=\{(\delta_1, \ell_1), \ldots, (\delta_d, \ell_d)\}$ is formed, where each $\delta_i$ is randomly chosen from inside the search space X and $\ell_i = f(\delta_i)$. From this, a Gaussian process GP is formed from D. Then, it is iterated as follows:
For t=d+1, . . . , q:

1) $\delta_t \leftarrow \operatorname*{argmax}_{|d|_\infty \leq \epsilon} A(GP, \delta)$ \\Find the maximizer $d_t$ of the acquisition function 2) $\ell_t \leftarrow f(\delta_t)$ \\Query $f$ 3) Break if $\ell_t = 0$; done since $x + U(\delta_t)$ is a successful adversarial attack -continued Otherwise, update dataset Gaussian process: 4)
   a. $D \leftarrow D \cup (\delta_t, \ell_t)$\\add the input-output pair to the dataset
   b. Update the Gaussian process with $(\delta_t, \ell_t)$ The attack was successful with t queries to the model if the break is performed during step 3 of iteration t; otherwise, the attack was unsuccessful.

The above algorithm may be varied in the following ways. In one variation, the initial choice of the dataset D to form a prior may be done using any distribution (Gaussian, uniform, etc.) or even deterministically (e.g., with Sobol sequences).

As another variation, while the above description assumes x is an image, and that the image is bounded in $L^\infty$ norm, this method can work equally well in other domains given an appropriate norm to measure perturbation size and an appropriate dimensionality reduction scheme. For example, the described approach can be translated to a classifier for audio, with a norm that measures human auditory perception.

As a further variation, the dimension reduction here is done by using a perturbation of dimension smaller than the original image in the Bayesian optimization loop, and then upsampling to obtain the actual considered perturbation. The upsampling may be performing using interpolation techniques in some variations, some examples of which include linear interpolation, bilinear interpolation, trilinear interpolation, bicubic interpolation, and so on. Other techniques for reducing the dimensionality are also possible, e.g., by training an autoencoder to produce a low-dimensional representation of perturbations.

As yet a further variation, notably this algorithm assumes that the classifier N outputs predictions for each possible class label. This is referred to as the soft-label case (e.g., score-based), in contrast to the hard-label case (e.g., decision-based), where the network outputs only the predicted class (i.e., only the index of the largest class of the soft-label output). The method can be adapted for the hard label case by using the objective function $f(\delta)=1$ if N predicts class y, and 0 otherwise.

Figure 3:
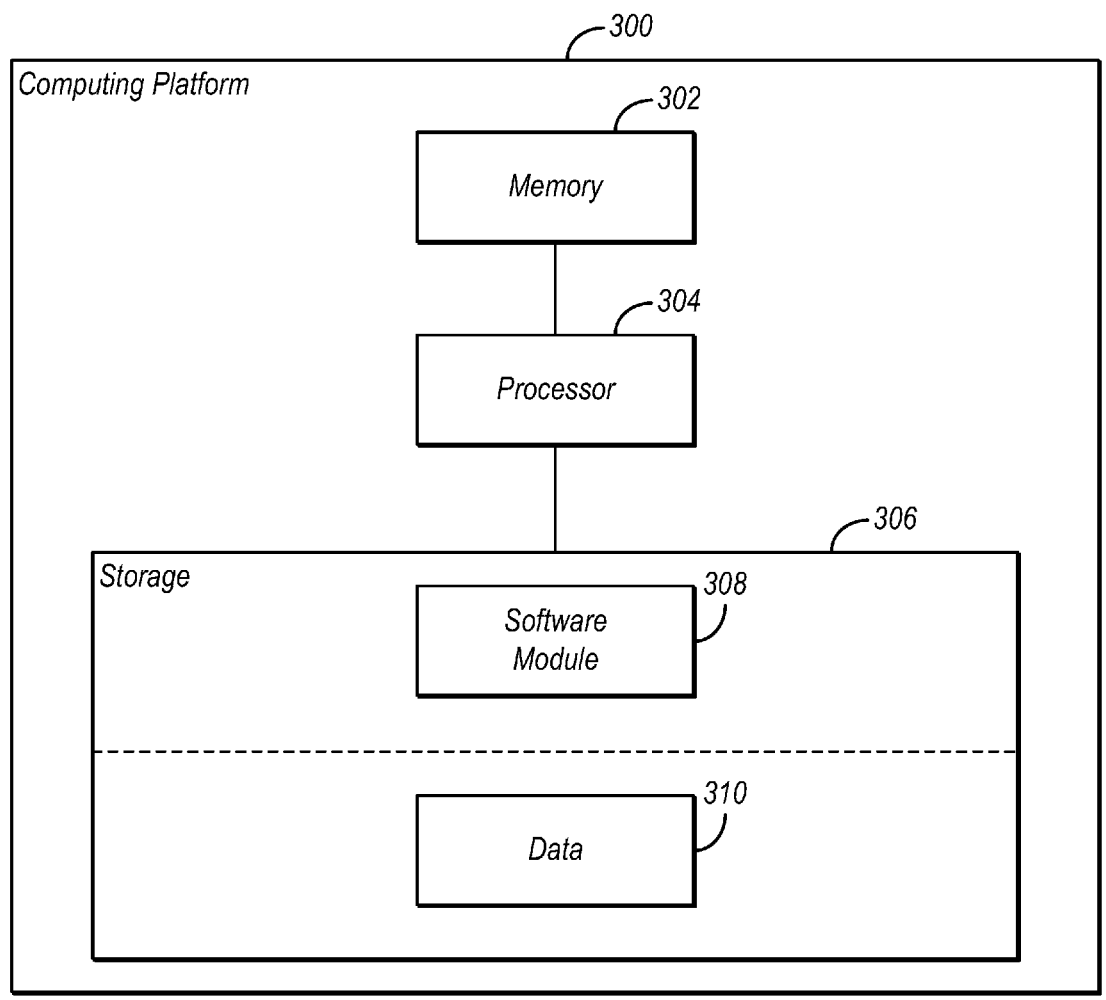
FIG. 3 is a schematic diagram of a computing platform that may be utilized to implement the Bayesian-optimization-based query-efficient black-box adversarial attacks.

The Bayesian optimization and dimensionality reduction algorithms and/or methodologies of one or more embodiments are implemented using a computing platform, as shown in FIG. 3. The computing platform 300 may include memory 302, processor 304, and non-volatile storage 306. The processor 304 may include one or more devices selected from high-performance computing (HPC) systems including high-performance cores, microprocessors, micro-controllers, digital signal processors, microcomputers, central processing units, field programmable gate arrays, programmable logic devices, state machines, logic circuits, analog circuits, digital circuits, or any other devices that manipulate signals (analog or digital) based on computer-executable instructions residing in memory 302. The memory 302 may include a single memory device or a number of memory devices including, but not limited to, random access memory (RAM), volatile memory, non-volatile memory, static random-access memory (SRAM), dynamic random access memory (DRAM), flash memory, cache memory, or any other device capable of storing information. The non-volatile storage 306 may include one or more persistent data storage devices such as a hard drive, optical drive, tape drive, non-volatile solid-state device, cloud storage or any other device capable of persistently storing information.

The processor 304 may be configured to read into memory 302 and execute computer-executable instructions residing in software module 308 of the non-volatile storage 306 and embodying Bayesian optimization and dimensionality reduction algorithms and/or methodologies of one or more embodiments. The software module 308 may include operating systems and applications. The software modules 308 may be compiled or interpreted from computer programs created using a variety of programming languages and/or technologies, including, without limitation, and either alone or in combination, Java, C, C++, C#, Objective C, Fortran, Pascal, Java Script, Python, Perl, and PL/SQL.

Upon execution by the processor 304, the computer-executable instructions of the software module 308 may cause the computing platform 300 to implement one or more of the Bayesian optimization and dimensionality reduction algorithms and/or methodologies disclosed herein. The non-volatile storage 306 may also include data 310 supporting the functions, features, and processes of the one or more embodiments described herein.

The program code embodying the algorithms and/or methodologies described herein is capable of being individually or collectively distributed as a program product in a variety of different forms. The program code may be distributed using a computer readable storage medium having computer readable program instructions thereon for causing a processor to carry out aspects of one or more embodiments. Computer readable storage media, which is inherently non-transitory, may include volatile and non-volatile, and removable and non-removable tangible media implemented in any method or technology for storage of information, such as computer-readable instructions, data structures, program modules, or other data. Computer readable storage media may further include RAM, ROM, erasable programmable read-only memory (EPROM), electrically erasable programmable read-only memory (EEPROM), flash memory or other solid state memory technology, portable compact disc read-only memory (CD-ROM), or other optical storage, magnetic cassettes, magnetic tape, magnetic disk storage or other magnetic storage devices, or any other medium that can be used to store the desired information and which can be read by a computer. Computer readable program instructions may be downloaded to a computer, another type of programmable data processing apparatus, or another device from a computer readable storage medium or to an external computer or external storage device via a network.

Computer readable program instructions stored in a computer readable medium may be used to direct a computer, other types of programmable data processing apparatus, or other devices to function in a particular manner, such that the instructions stored in the computer readable medium produce an article of manufacture including instructions that implement the functions, acts, and/or operations specified in the flowcharts or diagrams. In certain alternative embodiments, the functions, acts, and/or operations specified in the flowcharts and diagrams may be re-ordered, processed serially, and/or processed concurrently consistent with one or more embodiments. Moreover, any of the flowcharts and/or diagrams may include more or fewer nodes or blocks than those illustrated consistent with one or more embodiments.

While exemplary embodiments are described above, it is not intended that these embodiments describe all possible forms encompassed by the claims. The words used in the specification are words of description rather than limitation, and it is understood that various changes can be made without departing from the spirit and scope of the disclosure.

As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A method for performing an adversarial attack on a neural network classifier, comprising:
   constructing a dataset of input-output pairs, each input element of the input-output pairs randomly chosen from a search space, each output element of the input-output pairs indicating a prediction output of the neural network classifier for the corresponding input element;
   utilizing a Gaussian process on the dataset of input-output pairs to optimize an acquisition function to find a best perturbation input element from the dataset;
   upsampling the best perturbation input element to generate an upsampled best input element;
   adding the upsampled best input element to an original input to generate a candidate input;
   querying the neural network classifier to determine a classifier prediction for the candidate input;
   computing a score for the classifier prediction; and
   accepting the candidate input as a successful adversarial attack responsive to the classifier prediction being incorrect.

2. The method of claim 1, further comprising rejecting the candidate input responsive to the classifier prediction being correct.

3. The method of claim 2, further comprising responsive to rejecting the candidate input:
   adding the candidate input and classifier output to the dataset; and
   continuing to iterate through the dataset to generate candidate inputs until a predefined number of queries of the dataset have elapsed.

4. The method of claim 1, wherein the neural network classifier is an image classifier, the original input is an image input, the perturbation is an image perturbation, and the candidate input is a pixelwise sum of the image input and the image perturbation, wherein each pixel of the image perturbation is smaller than a predefined size.

5. The method of claim 4, wherein the perturbation input element is of a smaller dimension than the original image.

6. The method of claim 4, wherein the predefined size of the image perturbation is no larger than a particular value in either an $L_2$ norm or an $L_\infty$ norm.

7. The method of claim 1, wherein the neural network classifier is an audio classifier, the original input is an audio input, the perturbation is an audio perturbation, the candidate input is a sum of the audio input and the audio perturbation, and the norm for the classifier measures human auditory perception.

8. The method of claim 1, wherein the upsampling is performed using nearest-neighbor upsampling.

9. The method of claim 1, wherein the classifier outputs predictions for each of a plurality of possible class labels for the input to the classifier.

10. The method of claim 1, wherein the classifier outputs only the most likely predicted class of the plurality of possible class labels for the input to the classifier.

11. A computational system for performing an adversarial attack on a neural network classifier, the system comprising:
    a memory storing instructions of Bayesian optimization and dimensionality reduction algorithms of a software program; and
    a processor programmed to execute the instructions to perform operations including to
       construct a dataset of input-output pairs, each input element of the input-output pairs randomly chosen from a search space, each output element of the input-output pairs indicating a prediction output of the neural network classifier for the corresponding input element;
       utilize a Gaussian process on the dataset of input-output pairs to optimize an acquisition function to find a best perturbation input element from the dataset;
       upsample the best perturbation input element to generate an upsampled best input element;
       add the upsampled best input element to an original input to generate a candidate input;
       query the neural network classifier to determine a classifier prediction for the candidate input;
       compute a score for the classifier prediction;
       responsive to the classifier prediction being incorrect, accept the candidate input as a successful adversarial attack; and
       responsive to the classifier prediction being correct, rejecting the candidate input, add the candidate input and classifier output to the dataset; and continue to iterate through the dataset to generate candidate inputs until a predefined number of queries of the dataset have elapsed.

12. The computational system of claim 11, wherein the neural network classifier is an image classifier, the original input is an image input, the perturbation is an image perturbation, and the candidate input is a pixelwise sum of the image input and the image perturbation, wherein each pixel of the image perturbation is smaller than a predefined size.

13. The computational system of claim 12, wherein the perturbation input element is of a smaller dimension than the original image.

14. The computational system of claim 12, wherein the predefined size of the image perturbation is no larger than a particular value in either an $L_2$ norm or an $L_\infty$ norm.

15. The computational system of claim 11, wherein the neural network classifier is an audio classifier, the original input is an audio input, the perturbation is an audio perturbation, the candidate input is a sum of the audio input and the audio perturbation, and the norm for the classifier measures human auditory perception.

16. The computational system of claim 11, wherein the upsampling is performed using nearest-neighbor upsampling.

17. The computational system of claim 11, wherein the classifier outputs predictions for each of a plurality of possible class labels for the input to the classifier.

18. The computational system of claim 11, wherein the classifier outputs only the most likely predicted class of the plurality of possible class labels for the input to the classifier.

19. A non-transitory computer-readable medium comprising instructions for performing an adversarial attack on a neural network classifier that, when executed by a processor, cause the processor to:
  construct a dataset of input-output pairs, each input element of the input-output pairs randomly chosen from a search space, each output element of the input-output pairs indicating a prediction output of the neural network classifier for the corresponding input element;
  utilize a Gaussian process on the dataset of input-output pairs to optimize an acquisition function to find a best perturbation input element from the dataset;
  upsample the best perturbation input element to generate an upsampled best input element;
  add the upsampled best input element to an original input to generate a candidate input;
  query the neural network classifier to determine a classifier prediction for the candidate input;
  compute a score for the classifier prediction;
  responsive to the classifier prediction being incorrect, accept the candidate input as a successful adversarial attack; and
  responsive to the classifier prediction being correct, rejecting the candidate input, add the candidate input and classifier output to the dataset; and continue to iterate through the dataset to generate candidate inputs until a predefined number of queries of the dataset have elapsed.

20. The medium of claim 19, wherein the neural network classifier is an image classifier, the original input is an image input, the perturbation is an image perturbation, and the candidate input is a pixelwise sum of the image input and the image perturbation, wherein each pixel of the image perturbation is smaller than a predefined size.

21. The medium of claim 19, wherein the neural network classifier is an audio classifier, the original input is an audio input, the perturbation is an audio perturbation, the candidate input is a sum of the audio input and the audio perturbation, and the norm for the classifier measures human auditory perception.

* * * * *